US010689082B2

(12) United States Patent
Armstrong (10) Patent No.: US 10,689,082 B2
(45) Date of Patent: Jun. 23, 2020

(54) MECHANICALLY AND ELECTRICALLY DISTRIBUTED PROPULSION

(71) Applicant: Rolls-Royce North American Technologies, Inc., Indianapolis, IN (US)

(72) Inventor: Michael James Armstrong, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 439 days.

(21) Appl. No.: 15/486,220

(22) Filed: Apr. 12, 2017

(65) Prior Publication Data
US 2018/0297683 A1 Oct. 18, 2018

(51) Int. Cl.
*B63H 21/21* (2006.01)
*F02C 7/36* (2006.01)
(Continued)

(52) U.S. Cl.
CPC ............. *B63H 21/21* (2013.01); *B63H 21/20* (2013.01); *B63H 23/02* (2013.01); *F02C 7/36* (2013.01);
(Continued)

(58) Field of Classification Search
None
See application file for complete search history.

(56) References Cited

U.S. PATENT DOCUMENTS 4,927,329 A * 5/1990 Kliman .................. F01D 7/00
416/127
7,104,499 B1 9/2006 Arata
(Continued)

FOREIGN PATENT DOCUMENTS

EP 2581308 A2 4/2013
EP 2801719 A1 11/2014
(Continued)

OTHER PUBLICATIONS

Epstein, "Distributed Propulsion: New Opportunities for an Old Concept," Gas Turbine Laboratory, Department of Aeronautics and Astronautics, Massachusetts Institute of Technology, Final Technical Report, Dec. 2007, 41 pp.
(Continued)

*Primary Examiner* — Nicholas K Wiltey
(74) *Attorney, Agent, or Firm* — Shumaker & Sieffert, P.A.

(57) ABSTRACT

A distributed propulsion system is described that includes at least one turbine engine including an engine shaft and at least one mechanically driven propulsor, wherein a propulsor shaft of the at least one mechanically driven propulsor is not co-axial with the engine shaft of the at least one turbine engine and is driven by the engine shaft of the at least one turbine engine. The distributed propulsion system further includes at least one generator driven by rotation of at least one of the engine shaft of the at least one turbine engine or the propulsor shaft of the at least one mechanically driven propulsor. The distributed propulsion system also includes at least one electrically driven propulsor, wherein a propulsor motor of the at least one electrically driven propulsor drives a propulsor fan of the at least one electrically driven propulsor based on electricity produced by the at least one generator.

20 Claims, 6 Drawing Sheets

(51) Int. Cl.
  *B63H 21/20* (2006.01)
  *B63H 23/02* (2006.01)
  *G05D 1/08* (2006.01)
  *B64D 27/02* (2006.01)

(52) U.S. Cl.
  CPC ........ *G05D 1/0875* (2013.01); *B63B 2759/00* (2013.01); *B63H 2021/207* (2013.01); *B63H 2021/216* (2013.01); *B64D 2027/026* (2013.01); *F05D 2220/76* (2013.01); *F05D 2260/40* (2013.01); *Y02T 50/671* (2013.01); *Y10S 903/93* (2013.01)

(56) References Cited

U.S. PATENT DOCUMENTS

| | | | |
|---|---|---|---|
| 8,395,274 | B2 | 3/2013 | Nelson et al. |
| 9,096,312 | B2 | 8/2015 | Moxon |
| 10,227,138 | B2* | 3/2019 | De Magalhaes Gomes ................ B64D 31/10 |
| 2009/0097959 | A1 | 4/2009 | Vos et al. |
| 2009/0145998 | A1 | 6/2009 | Salyer |
| 2010/0072318 | A1* | 3/2010 | Westenberger ........ B64D 27/02 244/54 |
| 2012/0209456 | A1 | 8/2012 | Harmon et al. |
| 2013/0094963 | A1* | 4/2013 | Rolt ........................ B64D 27/02 416/1 |
| 2013/0223991 | A1* | 8/2013 | Suciu ..................... F01D 15/12 415/122.1 |
| 2014/0159371 | A1 | 6/2014 | Hugo et al. |
| 2015/0100181 | A1* | 4/2015 | Strauss .................. B64D 35/00 701/3 |
| 2015/0144742 | A1* | 5/2015 | Moxon .................. B64D 27/12 244/215 |
| 2015/0274306 | A1* | 10/2015 | Sheridan .................. F02C 7/36 60/772 |
| 2015/0284071 | A1 | 10/2015 | Veilleux, Jr. et al. |
| 2015/0367950 | A1* | 12/2015 | Rajashekara ......... B64C 11/305 701/3 |
| 2016/0236790 | A1* | 8/2016 | Knapp .................. B64C 11/001 |
| 2016/0257416 | A1* | 9/2016 | Himmelmann ........ B64D 27/02 |
| 2016/0332741 | A1* | 11/2016 | Moxon ................... B64C 15/00 |
| 2016/0340051 | A1* | 11/2016 | Edwards ................ B64D 27/02 |
| 2016/0355272 | A1 | 12/2016 | Moxon |
| 2016/0362187 | A1* | 12/2016 | Armstrong .............. B60L 50/10 |
| 2016/0365810 | A1* | 12/2016 | Armstrong ............ B63H 21/17 |
| 2017/0190434 | A1* | 7/2017 | Dong ..................... B64D 27/24 |
| 2017/0275013 | A1* | 9/2017 | Armstrong ............. B64D 35/02 |
| 2017/0349293 | A1* | 12/2017 | Klemen .................. B60L 50/15 |
| 2018/0079515 | A1* | 3/2018 | Harwood .................. H02J 7/34 |
| 2018/0251228 | A1* | 9/2018 | Sands .................... B64D 31/14 |
| 2019/0009920 | A1* | 1/2019 | Armstrong ............. B64D 31/06 |

FOREIGN PATENT DOCUMENTS

| | | |
|---|---|---|
| WO | 2013079972 A1 | 6/2013 |
| WO | 2014158240 A2 | 10/2014 |

OTHER PUBLICATIONS

Englar, "Pneumatic Aerodynamic/Propulsive Concepts for Distributed Propulsion Phase I—Quarterly Progress Report," Georgia Tech Research Institute, Oct. 30, 2007, 10 pp.
Chan, "Scaling Considerations for Small Aircraft Engines," Department of Aeronautics and Astronautics, Massachusetts Institute of Technology, Jun. 2008, 84 pp.
Kim, "Distributed Propulsion Vehicles," 27th International Congress of the Aeronautical Sciences, Sep. 19, 2010, 11 pp.
Felder et al., "Turboelectric Distributed Propulsion Engine Cycle Analysis for Hybrid-Wing-Body Aircraft," NASA Glenn Research Center, Jan. 2009, 25 pp.
U.S. Appl. No. 15/440,480, by Michael James Armstrong et al., filed Feb. 13, 2017.
U.S. Appl. No. 62/344,687, by Donald Klemen et al., filed Jun. 2, 2016.
Extended Search Report from counterpart European Application No. 18161183.1, dated Aug. 28, 2018, 7 pp.
Response to Extended Search Report dated Aug. 28, 2018, from counterpart European Application No. 18161183.1, filed Mar. 22, 2019, 67 pp.

* cited by examiner

MECHANICALLY AND ELECTRICALLY DISTRIBUTED PROPULSION

TECHNICAL FIELD

This disclosure relates to distributed propulsion systems.

BACKGROUND

A distributed propulsion system may include one or more turbine engines configured to generate mechanical power by burning fuel. The turbine engines may directly or indirectly drive one or more propulsors to create propulsion (e.g., for a vehicle) and one or more generators to produce electricity. Some "mechanically driven" propulsors may include non-remote fans mounted to co-axial engine shafts of the turbine engines. The non-remote fans may be a part of the turbine engines. Other "electrically driven" propulsors may include remote fans driven by motors that are powered by the generators. In this way, the distributed propulsion system may use a mixture of mechanically driven, co-axial, non-remote propulsors and electrically driven, remote propulsors to create propulsion for the vehicle.

SUMMARY

In some examples, the disclosure describes a distributed propulsion system that includes at least one turbine engine including an engine shaft and at least one mechanically driven propulsor, wherein a propulsor shaft of the at least one mechanically driven propulsor is not co-axial with the engine shaft of the at least one turbine engine and is driven by the engine shaft of the at least one turbine engine. The distributed propulsion system further includes at least one generator driven by rotation of at least one of the engine shaft of the at least one turbine engine or the propulsor shaft of the at least one mechanically driven propulsor or mounted to the mechanical distribution system. The distributed propulsion system also includes at least one electrically driven propulsor, wherein a propulsor motor of the at least one electrically driven propulsor drives a propulsor fan of the at least one electrically driven propulsor based on electricity produced by the at least one generator.

In some examples, the disclosure describes a method including controlling whether a propulsor shaft of at least one mechanically driven propulsor is driven or not driven by an engine shaft of at least one turbine engine, wherein the propulsor shaft of the at least one mechanically driven propulsor is not co-axial with the engine shaft of the at least one turbine engine and driven by the engine shaft of the at least one turbine engine. The method further includes controlling whether at least one generator is driven or not driven by rotation of at least one of: the engine shaft of the at least one turbine engine or the propulsor shaft of the at least one mechanically driven propulsor. The method further includes controlling whether a propulsor motor of at least one electrically driven propulsor drives a propulsor fan of the at least one electrically driven propulsor based on electricity produced by the at least one generator.

In some examples, the disclosure describes a vehicle including at least one first turbine engine including an engine shaft and at least one first inboard propulsor, wherein a propulsor shaft of the at least one first inboard propulsor is not co-axial with the engine shaft of the at least one first turbine engine and driven by the engine shaft of the at least one first turbine engine. The vehicle further includes at least one first generator driven by rotation of at least one of the engine shaft of the at least one first turbine engine or the propulsor shaft of the at least one first inboard propulsor, at least one second turbine engine including an engine shaft, and at least one second inboard propulsor, wherein a propulsor shaft of the at least one first inboard propulsor is not co-axial with the engine shaft of the at least one second turbine engine and driven by the engine shaft of the at least one second turbine engine. The vehicle further includes at least one second generator driven by rotation of at least one of the engine shaft of the at least one second turbine engine or the propulsor shaft of the at least one second inboard propulsor, at least one first outboard propulsor, wherein a propulsor motor of the at least one first outboard propulsor drives a propulsor fan of the at least one first outboard propulsor based on electricity produced by the at least one first generator, and at least one second outboard propulsor, wherein a propulsor motor of the at least one second outboard propulsor drives a propulsor fan of the at least one second outboard propulsor based on electricity produced by the at least one first generator. The at least one first inboard propulsor and the at least one second outboard propulsor are positioned on a first side of a central axis of the vehicle, and the at least one second inboard propulsor and the at least one first outboard propulsor are positioned on a second side of the central axis.

The details of one or more examples are set forth in the accompanying drawings and the description below. Other features, objects, and advantages will be apparent from the description and drawings, and from the claims.

DETAILED DESCRIPTION

In general, this disclosure describes techniques for implementing a unique hybrid electrical-mechanical distributed propulsion system (referred to simply as "a propulsion system") that relies on at least one mechanically driven propulsor that is driven by a non-co-axial engine shaft of a turbine engine, and at least one electrically driven propulsor that is driven by a motor using electricity produced by a generator (e.g., based on rotation of the engine shaft, a shaft coupled to the at least one mechanically or electrically driven propulsors, or some other mechanical shaft). The at least one electrically driven propulsor and the at least one mechanically driven propulsor may be remote from the turbine engine, i.e., outside of the turbine engine and not co-axial with the engine shaft. The example propulsion system may include any quantity of turbine engines, generators, and mechanically driven and electrically driven propulsors that are configured in this way.

In some examples, the mechanically driven and electrically driven propulsors may be used to augment the aerodynamics of a vehicle. The at least one mechanically driven propulsor may be positioned adjacent to the turbine engine to reduce the mass and power losses that may be associated with electrical power generation and conversion. A generator may produce electricity based on rotation of the engine shaft or a shaft of the mechanically driven propulsor, and the electricity may be distributed to the at least one electrically driven propulsor. The at least one electrically driven propulsor may be positioned farther from the turbine engine than the at least one mechanically driven propulsor. The electrical distribution system may cross feed the electricity from a generator on one side of the system to the at least one electrically driven propulsor on the other side of the system. In the event of an engine failure, a remaining turbine engine may drive mechanically driven and electrically driven propulsors on both sides of a vehicle to control yaw. The system may also include at least one propulsor configured to perform boundary layer ingestion at the surface of the vehicle.

Purely mechanically distributed propulsion systems may be lighter and have a higher efficiency as compared to purely electrically distributed propulsion systems. However, purely electrically distributed propulsion systems may offer better modularity, easier distribution, and easier reconfiguration in the event of an engine fault, as compared to purely mechanically distributed propulsion systems. For example, an electrical distribution system may include wires that are flexible, in contrast to the shafts and gears of a mechanical distribution system that may be relatively less flexible. A controller may vary the speed of an electrically driven propulsor even without varying the engine speed, whereas the speed of a mechanically driven propulsor may be based on the engine speed, as well as gear and shaft ratios. Electrically driven propulsion may also include energy storage, where the stored energy may be used at a later time to supplement or replace power produced by a turbine engine.

Mechanical distribution of power may be relatively more convenient and efficient for propulsors that are adjacent to a turbine engine. Electrical distribution of power may be more convenient for propulsors that are located a longer distance from the turbine engine. Electrical distribution of power may also be more convenient for a turbine engine that drives a remote propulsor that is located across a central axis of the system. In the example of a vehicle such an aircraft, propulsors located on the wingtips and at the aft end of the vehicle may be better suited for electrically power due to the distance between the turbine engine and these propulsors.

Therefore, rather than using only mechanically driven propulsors or only electrically driven propulsors, the hybrid distributed propulsion system described herein includes both mechanically driven propulsors and electrically driven propulsors. The hybrid distributed propulsion system is a balance of the advantages of electrically distributed propulsion and the advantages of mechanically distributed propulsion. At relatively long distances from a turbine engine, the hybrid distributed propulsion system may include electrically driven propulsors because it may difficult to route a mechanical distribution system along such distances. At relatively short distances, the hybrid distributed propulsion system may include mechanically driven propulsors to avoid the weight and power losses associated with an electrical distribution system.

Figure 1:
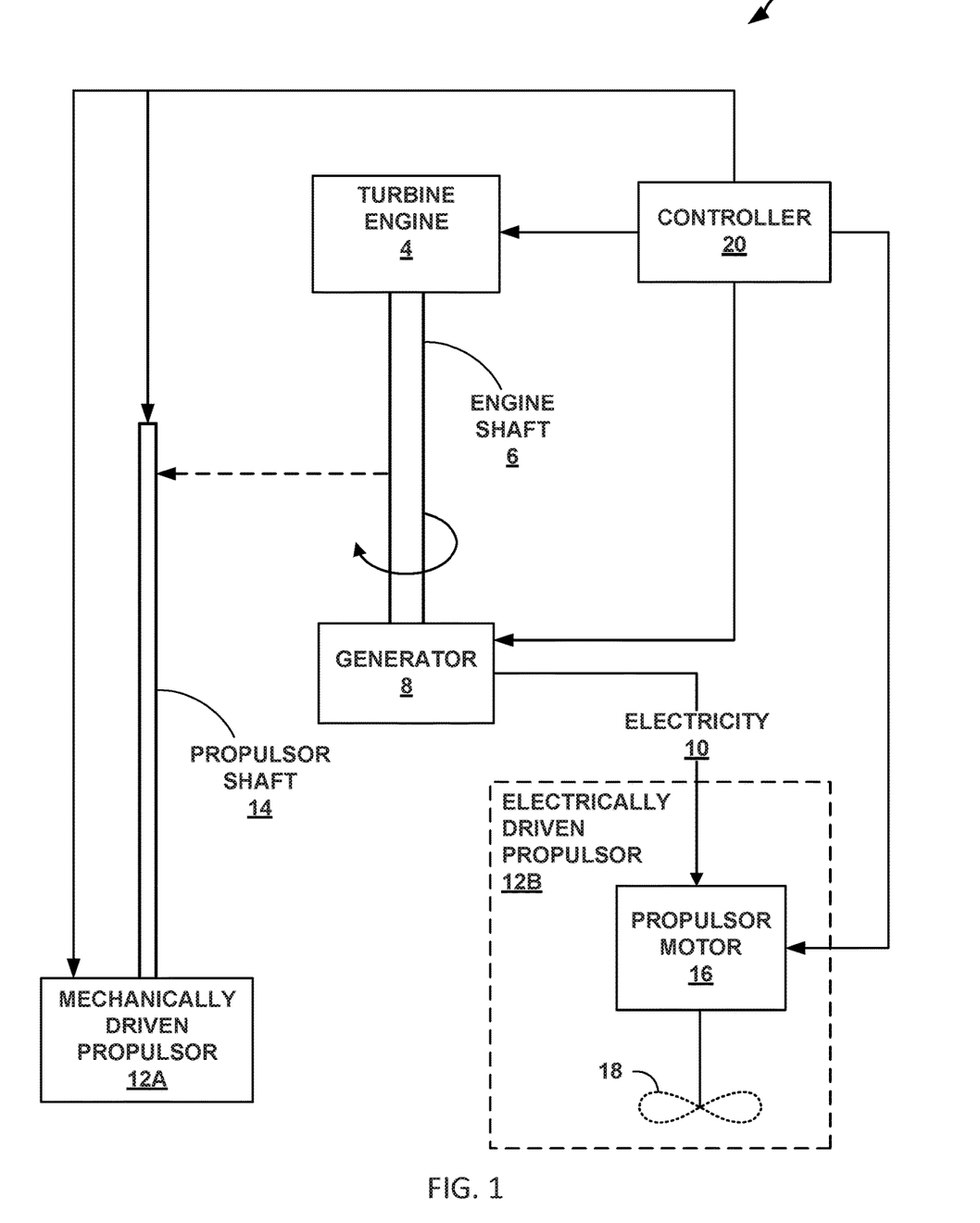
FIG. 1 is a conceptual block diagram illustrating a distributed propulsion system including a turbine engine and two propulsors, in accordance with one or more techniques of this disclosure.

FIG. 1 is a conceptual block diagram illustrating a distributed propulsion system 2 including a turbine engine 4 and two propulsors 12A and 12B, in accordance with one or more techniques of this disclosure. System 2 may include at least one turbine engine 4 including engine shaft 6, at least one generator 8, at least one mechanically driven propulsor 12A including propulsor shaft 14, at least one electrically driven propulsor 12B including propulsor motor 16 and propulsor fan 18, and controller 20. System 2 may be configured to deliver mechanical power to propulsor shaft 14 to drive mechanically driven propulsor 12A. System 2 may also be configured to deliver electricity 10 to electrically driven propulsor 12B, where propulsor motor 16 may drive propulsor fan 18. The propulsion created by propulsors 12A and 12B may be used in a variety of ways or for a variety of systems and applications (e.g., aircraft, locomotives, marine craft, power plants, electric generators, and any or all other systems and applications that rely on mechanical energy from a turbine engine to perform work).

Turbine engine 4 is configured to rotate engine shaft 6. In some examples, system 2 may include one or more additional turbine engines not shown in FIG. 1. In some examples, turbine engine 4 may include a compressor, a combustor, and a turbine, and additional components necessary to rotate engine shaft 6 that are not shown in FIG. 1. In some examples, turbine engine 4 may include generator 8, and generator 8 may be positioned inside of turbine engine 4. In other examples, generator 8 may be separate from turbine engine 4 and generator 8 may be positioned outside of turbine engine 4. Turbine engine 4 may be a gas turbine engine, a nuclear turbine engine, a steam turbine engine, internal combustion engine, Wankel engine, diesel engine, rotary engine, and/or any other suitable turbine engine.

Engine shaft 6 is configured to rotate based on mechanical energy from turbine engine 4. In other words, engine shaft 6 may rotate at a rotational speed. Engine shaft 6 may be connected to generator 8 such that engine shaft 6 drives a rotor in generator 8. Engine shaft 6 may include a low-pressure (LP) shaft, a high-pressure (HP) shaft, or an auxiliary shaft that is driven by the LP shaft or the HP shaft. The core power of turbine engine 4 may drive the rotation of engine shaft 6.

Generator 8 is configured to convert mechanical power derived from engine shaft 6 to electrical power for use by other components or circuits. In some examples, generator 8 may also be mounted to a mechanical distribution system and/or a mechanical transmission system. Generator 8 may be configured to be driven by engine shaft 6, propulsor shaft 14. the mechanical distribution system, and/or the mechanical transmission system. In some examples, system 2 may include one or more additional generators not shown in FIG. 1. Generator 8 may be an AC generator such as an induction generator. Generator 8 may be configured to produce electricity 10 based on a rotation of engine shaft 6. In some examples, generator 8 may be configured to produce electricity 10 based on a rotation of another shaft that is operably coupled to engine shaft 6, such as propulsor shaft 14. Generator 8 may be mounted to either of engine shaft 6 or propulsor shaft 14. Generator 8 may include a wound field machine, a Halbach array generator with permanent magnets on a rotor that is driven by engine shaft 6, or any other type of generator. In some examples, generator 8 may be integrated into turbine engine 4 and driven by an LP shaft.

Propulsors 12A and 12B may be remote from turbine engine 4. In some examples, system 2 may include one or more additional mechanically driven propulsors and one or more additional electrically driven propulsors not shown in FIG. 1. In some examples, one or both of propulsors 12A and 12B may be positioned on a wing of an aircraft whereas turbine engine 4 may be positioned at or near a fuselage of the aircraft. One or both of propulsors 12A and 12B may include a boundary layer ingestion (BLI) fan configured to activate the boundary layer of a vehicle. One or both of propulsors 12A and 12B may include a partially distributed propulsion system, a wing-embedded fan, a blown-wing fan, a wing-tip fan, a surface-mounted BLI fan, and/or any other suitable fan and/or propulsor.

Mechanically driven propulsor 12A is configured to be driven by propulsor shaft 14 to generate propulsion. Propulsor shaft 14 is configured to be driven by engine shaft 6. The torque of propulsor shaft 14 may be imparted by the core or turbine engine 4 or by generator 8. If variable features are available on mechanically driven propulsor 12A, such as variable pitch, engine shaft 6 may rotate with little power transfer to mechanically driven propulsor 12A but with power transfer to generator 8. In some examples, mechanically driven propulsor 12A may not include a co-axial turbine engine because propulsor shaft 14 is driven by engine shaft 6. Mechanically driven propulsor 12A may also be integrated within system 2 to provide aerodynamic improvements, such as a wing integration fan, a blown wing fan, a boundary layer ingestion fan, or a wing-tip propulsor. Mechanically driven propulsor 12A may be separated from the low-pressure shaft by a power transmission system, in addition to or alternatively to a gearbox. System 2 may transmit mechanical power from engine shaft 6 to propulsor shaft 14 using a mechanical distribution system (i.e., a transmission system) including one or more gears and/or one or more additional shafts. Propulsor shaft 14 may not be co-axial with engine shaft 6. In other words, propulsor shaft 14 may not be directly mounted on engine shaft 6.

Electrically driven propulsor 12B includes propulsor motor 16 and propulsor fan 18. Propulsor motor 16 is configured to drive propulsor fan 18 based on electricity 10 produced by generator 8. Propulsor fan 18 is configured to be driven by propulsor motor 16 to generate propulsion based on the mechanical power produced by propulsor motor 16. System 2 may transmit electricity 10 from generator 8 to propulsor motor 16. Electricity 10 may be direct-current (DC) electricity or alternating-current (AC) electricity with a single phase or multiple phases, such as three-phase AC electricity. Propulsor motor 16 may be configured to convert electrical energy to mechanical energy to drive propulsor fan 18. The terms "electrical power" and "mechanical power" may refer to rates of consuming or generating electrical energy or mechanical energy.

Controller 20 is configured to control how mechanically driven propulsor 12A is driven or not driven by propulsor shaft 14 via engine shaft 6. Propulsor shaft 14 may be operably coupled to engine shaft 6 such that the rotation of propulsor shaft 14 is based on the rotation of engine shaft 6. Controller 20 may be configured to control a transmission, a clutch, or other mechanical distribution system that couples propulsor shaft 14 to engine shaft 6. Controller 20 may be configured to cause the mechanical distribution system to couple and/or decouple propulsor shaft 14 from engine shaft 6. Controller 20 may also be configured to control the pitch of the blades of mechanically driven propulsor 12A and/or the pitch of the blades of propulsor fan 18.

Controller 20 is also configured to control whether generator 8 is driven or not driven by rotation of at least one of engine shaft 6 or propulsor shaft 14, depending on the positioning of generator 8. Controller 20 may be configured to control whether an excitation current is supplied to field coils in a rotor of generator 8. The excitation current may cause the field coils to operate as electromagnets, causing field windings in the armature of generator 8 to conduct electricity. Controller 20 may be configured to control the electricity outputted by generator 8 by controlling the power electronics circuitry connected to generator 8 by, for example, controlling the switching frequency and/or duty cycle of control signals delivered to the power electronics circuitry.

Controller 20 is also configured to control whether propulsor motor 16 drives propulsor fan 18 based on electricity 10 produced by generator 8. Propulsor motor 16 may be connected to generator 8 by one or more wires and optional power conversion circuitry (e.g., rectifier circuitry, switched mode power circuitry, inverter circuitry, and/or transformer circuitry, etc.). Controller 20 may be configured to operate a reconfiguration element to switch on or off the electrical connection between generator 8 and propulsor motor 16. Controller 20 may be configured to control the speed of propulsor motor 16 by, for example, controlling the switching frequency and/or duty cycle of control signals delivered to power electronics circuitry connected to propulsor motor 16. Controller 20 may also be configured to control the pitch of the blades of propulsor fan 18 to control the thrust generated by propulsor fan 18.

Controller 20 may include any suitable arrangement of hardware, software, firmware, or any combination thereof, to perform the techniques attributed to controller 20 herein. Examples of controller 20 include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When controller 20 includes software or firmware, controller 20 further includes any necessary hardware for storing and executing the software or firmware, such as one or more processors or processing units. In some examples, controller 20 may be integrated with the control unit for turbine engine 4, which may include a FADEC unit.

In general, a processing unit may include one or more microprocessors, DSPs, ASICs, FPGAs, or any other equivalent integrated or discrete logic circuitry, as well as any combinations of such components. Although not shown in FIG. 1, controller 20 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 20 (e.g., may be external to a package in which controller 20 is housed).

Although controller 20 is generally described as being the primary unit for controlling each of the components of system 2 for performing the techniques described herein, in some examples, the individual components of system 2 may include additional functionality for performing some or all of the operations described below with respect to controller 20. For example, a combination of one or more of turbine engine 4, generator 8, mechanically driven propulsor 12A, propulsor motor 16, and propulsor fan 18 may include components for controlling the generation, transmission, and use of mechanical power and electricity in system 2.

Controller 20 is configured to control whether propulsor shaft 14 is driven or not driven by engine shaft 6. System 2 may include a mechanical distribution system (not shown in FIG. 1) that couples propulsor shaft 14 to engine shaft 6. Controller 20 may be configured to cause the mechanical distribution system to couple and/or decouple propulsor shaft 14 from engine shaft 6. The mechanical distribution system may couple and/or decouple by hydraulically clutching and/or unclutching the shafts of the mechanical distribution system. Controller 20 may also be configured to control the pitch of the blades of mechanically driven propulsor 12A.

Controller 20 is also configured to control whether generator 8 is driven or not driven by rotation of at least one of engine shaft 6 or propulsor shaft 14, depending on the positioning of generator 8. Controller 20 may be configured to control whether generator 8 is driven by controlling an excitation current through the field coils in a rotor of generator 8. When controller 20 causes circuitry to deliver an excitation current to the field coils of the rotor, the field coils may operate as electromagnets, causing the field windings in an armature of generator 8 to conduct electricity.

Controller 20 is also configured to control whether propulsor motor 16 drives propulsor fan 18 based on electricity 10 produced by generator 8. Propulsor motor 16 may be connected to generator 8 by one or more wires and optional power conversion circuitry. Controller 20 may be configured to operate switching circuitry to switch on or off the electrical connection between generator 8 and propulsor motor 16. Controller 20 may switch on or off the electrical connection between propulsor motor 16 other energy sources, such as an electrical bus and/or an energy storage unit. Controller 20 may also control the thrust produced by electrically driven propulsor 12B by controlling the amount of electrical power delivered by an electrical distribution system (not shown in FIG. 1) to propulsor motor 16.

In accordance with the techniques of this disclosure, system 2 may be configured such that turbine engine 4 drives mechanically driven propulsor 12A by mechanical power and electrically driven propulsor 12B by electrical power. Engine shaft 6 may be configured to drive propulsor shaft 14 to cause mechanically driven propulsor 12A to generate propulsion. Generator 8 may be operably coupled to engine shaft 6 and/or propulsor shaft 14 and configured to produce electricity 10 for propulsor motor 16 to drive propulsor fan 18. Mechanically driven propulsor 12A may potentially have higher efficiency and lighter weight due to the mechanical coupling between engine shaft 6 and propulsor shaft 14. Electrically driven propulsor 12B may have easier distribution and easier reconfiguration of the electrical connection between generator 8 and propulsor motor 16, as compared to a mechanical distribution system.

In some examples, a distributed propulsion system may include more than one turbine engine. Each turbine engine may be configured to drive mechanically driven propulsors and electrically driven propulsors. The distributed propulsion system may also include a central axis, where each turbine engine is configured to drive one or more propulsors on each side of the central axis.

Figure 2:
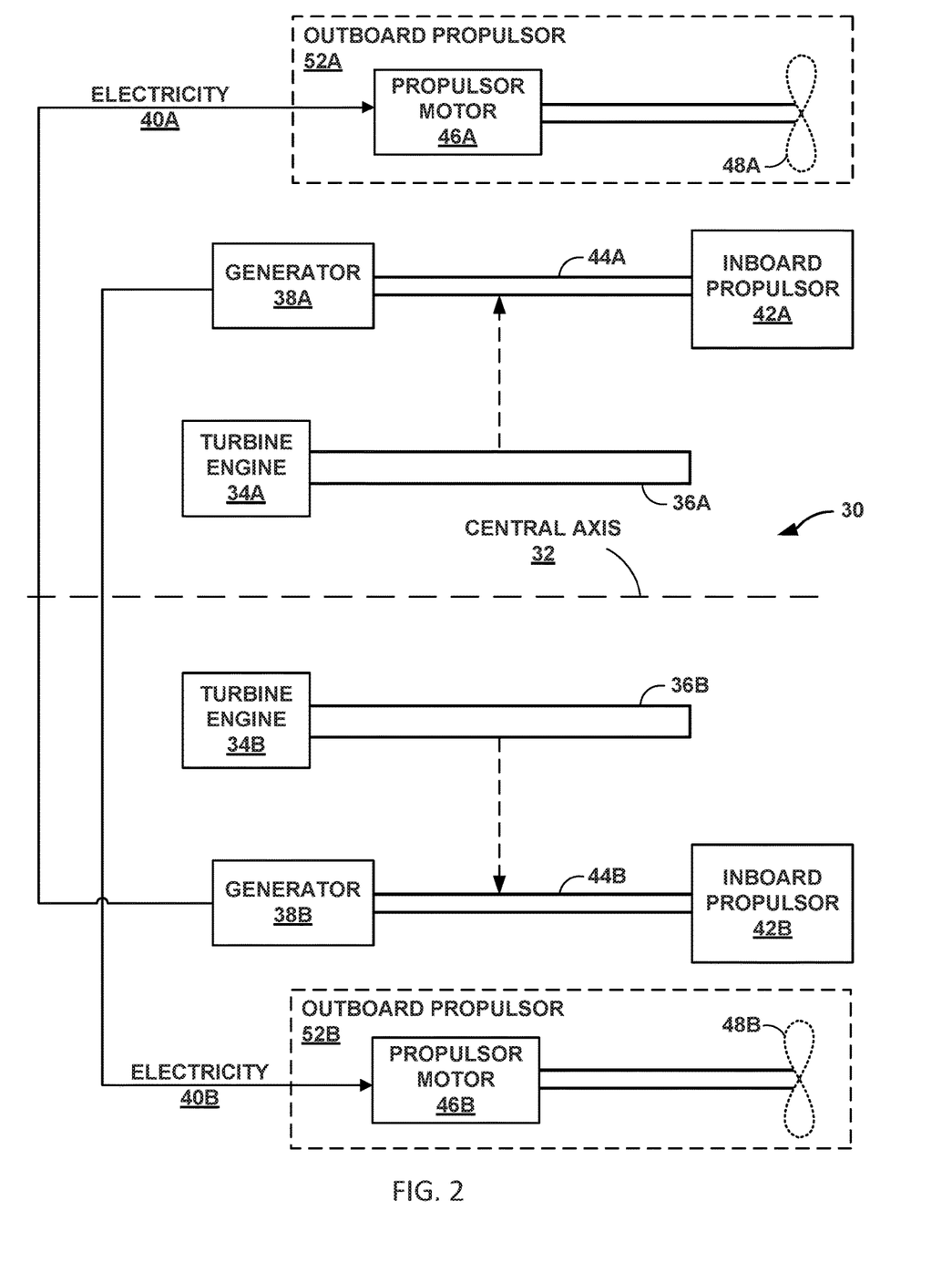
FIG. 2 is a conceptual block diagram illustrating a distributed propulsion system including two turbine engines and four propulsors, in accordance with one or more techniques of this disclosure.

FIG. 2 is a conceptual block diagram illustrating a distributed propulsion system 30 including two turbine engines 34A and 34B and four propulsors 42A, 42B, 52A, and 52B, in accordance with one or more techniques of this disclosure. In some examples, system 30 may include additional or fewer turbine engines, additional or fewer generators, additional or fewer inboard propulsors, and/or additional or fewer outboard propulsors. System 30 includes central axis 32 that divides system 30 into two areas or sides. In some examples, each side of system 30, as defined by central axis 32, includes at least one turbine engine, at least one mechanically driven propulsor, and at least one electrically driven propulsor. For example, in cases where system 30 is part of an aircraft, central axis 32 may correspond to a centerline axis that extends from nose to tail of the aircraft along a centerline of a fuselage of the aircraft. In such a case, one side of system 30 may be the portside of the aircraft and the other side of system 30 may be the starboard side of the aircraft.

In some examples, each side of system 30 may also include a generator that produces electricity to drive a propulsor motor on the other side of system 30. For example, generator 38A may produce electricity 40B based on the rotation of propulsor shaft 44A, which is driven by engine shaft 36A. Propulsor motor 46B may drive propulsor fan 48B based on electricity 40B. Generator 38A and propulsor motor 46B may be positioned on different sides of central axis 32. This configuration allows each of turbine engines 34A and 34B to provide energy to propulsors on both sides of system 30. If turbine engine 34B fails, turbine engine 34A may be configured to drive inboard propulsor 42A on one side of system 30 and outboard propulsor 52B on the other side of system 30. The configuration where each of turbine engines 34A and 34B can drive propulsors on both sides of system 30 may allow system 30 to reduce the yaw that occurs if one of turbine engines 34A and 34B fails, which is known as a "single engine out event."

System 30 includes mechanically driven inboard propulsors 42A and 42B and electrically driven outboard propulsors 52A and 52B. The term "inboard propulsor" as used herein refers to a propulsor positioned closer in distance to central axis 32 (e.g., nearer to a fuselage of an aircraft) than other "outboard propulsors." Term "outboard propulsor" as used herein refers to a propulsor positioned further in distance from central axis 32 (e.g., nearer to a wingtip of an aircraft) than other "outboard propulsors."

It may be desirable for each of turbine engines 34A and 34B to mechanically drive a nearby propulsor, such as one of inboard propulsors 42A and 42B, and electrically drive propulsor that is farther away, such as outboard propulsors 52A and 52B. The mechanical distribution system between engine shaft 36A and propulsor shaft 44A may be less modular than the electrical distribution system between generator 38A and propulsor motor 46B. The mechanical distribution system may include one or more gears and one or more shafts, in addition to an engine shaft and a propulsor shaft. In contrast, the electrical distribution system may include wires and power conversion circuitry, which are relatively small in volume compared to the elements of a mechanical distribution system. Moreover, the wires of an electrical distribution system may be routed in tighter spaces, and it may be easier to install and connect wires than to install and connect the gears and shafts of a mechanical distribution system. An electrical distribution system may be less impacted by structural deflections in system 30, as compared to a mechanical distribution system. If system 30 includes a wing, an electrical distribution system in the wing may have fewer design constraints, as compared to a mechanical distribution system. It may also be easier to cross feed electrical power from a turbine engine to a remote propulsor, as compared to cross shafting mechanical power from the turbine engine to the remote propulsor.

Each of outboard propulsors 52A and 52B may be positioned farther away from central axis 32 than a respective one of inboard propulsors 42A and 42B. Turbine engine 34A may be positioned closer to inboard propulsor 42A than to outboard propulsor 52A. Turbine engine 34B may be positioned closer to inboard propulsor 42B than to outboard propulsor 52B. Thus, each of turbine engines 34A and 34B is considered to be adjacent to a respective one of inboard propulsors 42A and 42B and distant to a respective one of outboard propulsors 52A and 52B. In this way, "cross-shafting" may be avoided by positioning a turbine engine on the same side as a respective mechanically driven propulsor that the turbine engine drives.

System 30 may include a controller (not shown in FIG. 2) configured to control whether one or both of propulsor shafts 44A and 44B are driven or not driven by a respective one or both of engine shafts 36A and 36B. The controller may also be configured to control whether one or both of generators 38A and 38B are driven or not driven by rotation of at least one of a respective engine shaft or a respective propulsor shaft. The controller may also be configured to control whether one or both of propulsor motors 46A and 46B drives a respective one or both of propulsor fans 48A and 48B based on electricity 40A and/or 40B.

In some examples, each of generators 38A and 38B may be driven by the rotation of a respective one of propulsor shafts 44A and 44B, instead of being driven by the rotation of a respective one of engine shafts 36A and 36B. Generators 38A and 38B may be driven by propulsor shafts instead of engine shafts because there may be more space to position generators 38A and 38B outside of turbine engines 34A and 34B, as compared to inside turbine engines 34A and 34B.

Figure 3:
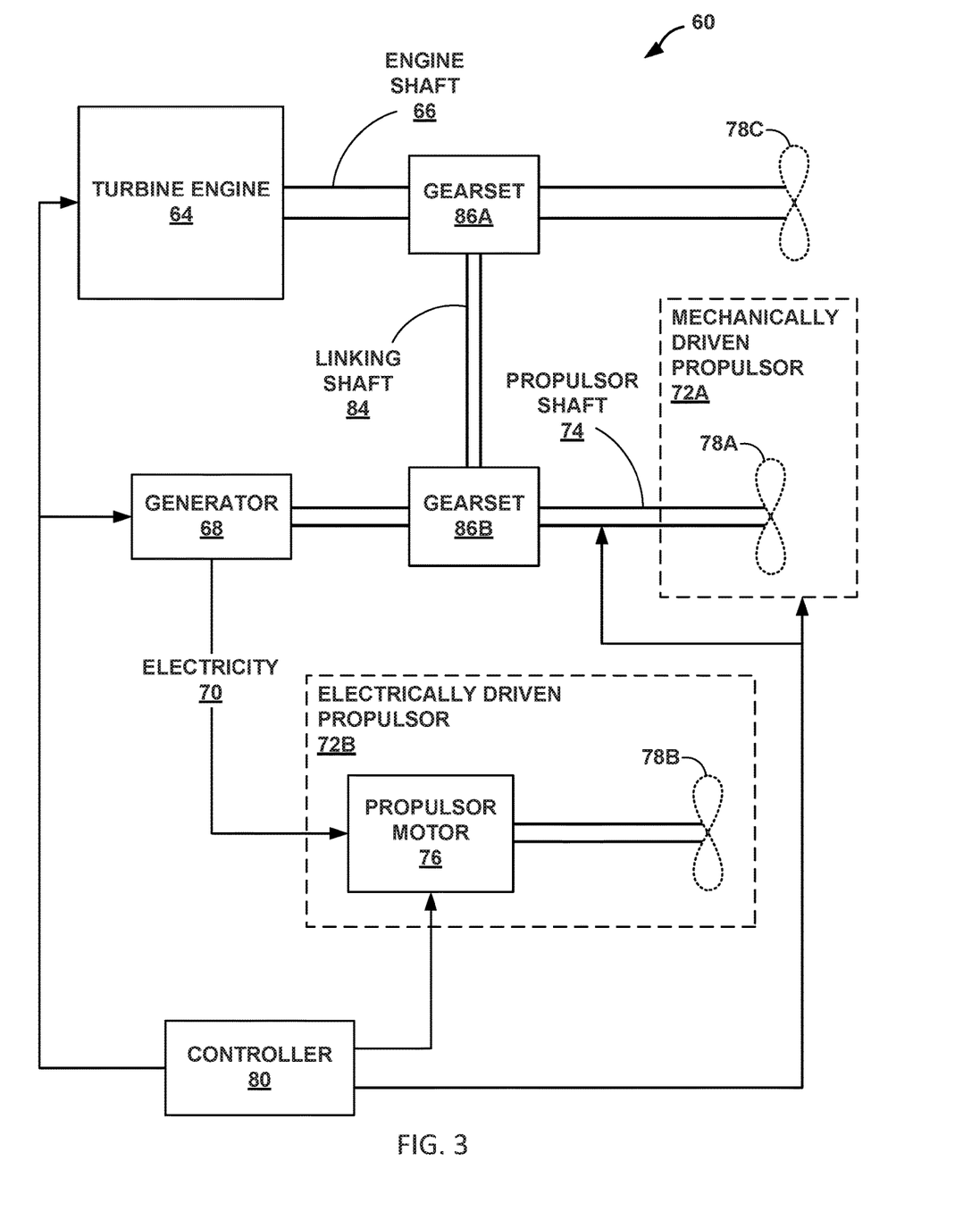
FIG. 3 is a conceptual block diagram illustrating a distributed propulsion system including a turbine engine, two propulsors, and a generator configured to produce electricity based on rotation of a propulsor shaft, in accordance with one or more techniques of this disclosure.

FIG. 3 is a conceptual block diagram illustrating a distributed propulsion system 60 including a turbine engine 64, two propulsors 72A and 72B, and a generator 68 configured to produce electricity 70 based on rotation of a propulsor shaft 74, in accordance with one or more techniques of this disclosure. In some examples, system 60 may include additional or fewer turbine engines, additional or fewer generators, additional or fewer inboard propulsors, and/or additional or fewer outboard propulsors. The components of system 60 may function similar to the components of system 2 in FIG. 1, except that generator 68 is coupled to propulsor shaft 74 instead of engine shaft 66.

System 60 includes a mechanical distribution system that causes propulsor shaft 74 to rotate based on the rotation of engine shaft 66. The mechanical distribution system may include gearsets 86A and 86B and linking shaft 84. Linking shaft 84 may be mechanically coupled to engine shaft 66 by gearset 86A and to propulsor shaft 74 by gearset 86A. Each of gearsets 86A and 86B may include one or more gears configured to rotate based on the rotational speeds of engine shaft 66, linking shaft 84, and/or propulsor shaft 74. Gearsets 86A and 86B may also include mechanical elements that are not depicted in FIG. 3, such as hydraulic controls, clutching, and/or transmission. Through gearset 86A, engine shaft 66 may drive the rotation of linking shaft 84. Through gearset 86B, linking shaft 84 may drive the rotation of propulsor shaft 74. Thus, the angular velocity of propulsor shaft 74 may depend on the angular velocity of engine shaft 66 and the sizes and number of teeth of the respective gears in gearset 86A and 86B.

System 60 also includes engine fan 78C that is co-axial with engine shaft 66. Engine fan 78C may be a mechanically driven propulsor, but engine fan 78C may not be a "remote propulsor" because engine fan is co-axial with engine shaft 66. Engine fan 78C may be directly mounted on engine shaft 66 or on a shaft that is co-axial with engine shaft 66. Engine shaft 66 may drive engine fan 78C such that engine fan 78C generates propulsion based on the rotation of engine shaft 66. In some examples, engine fan 78C may be located inside the barrel or nacelle of turbine engine 64.

Figure 4:
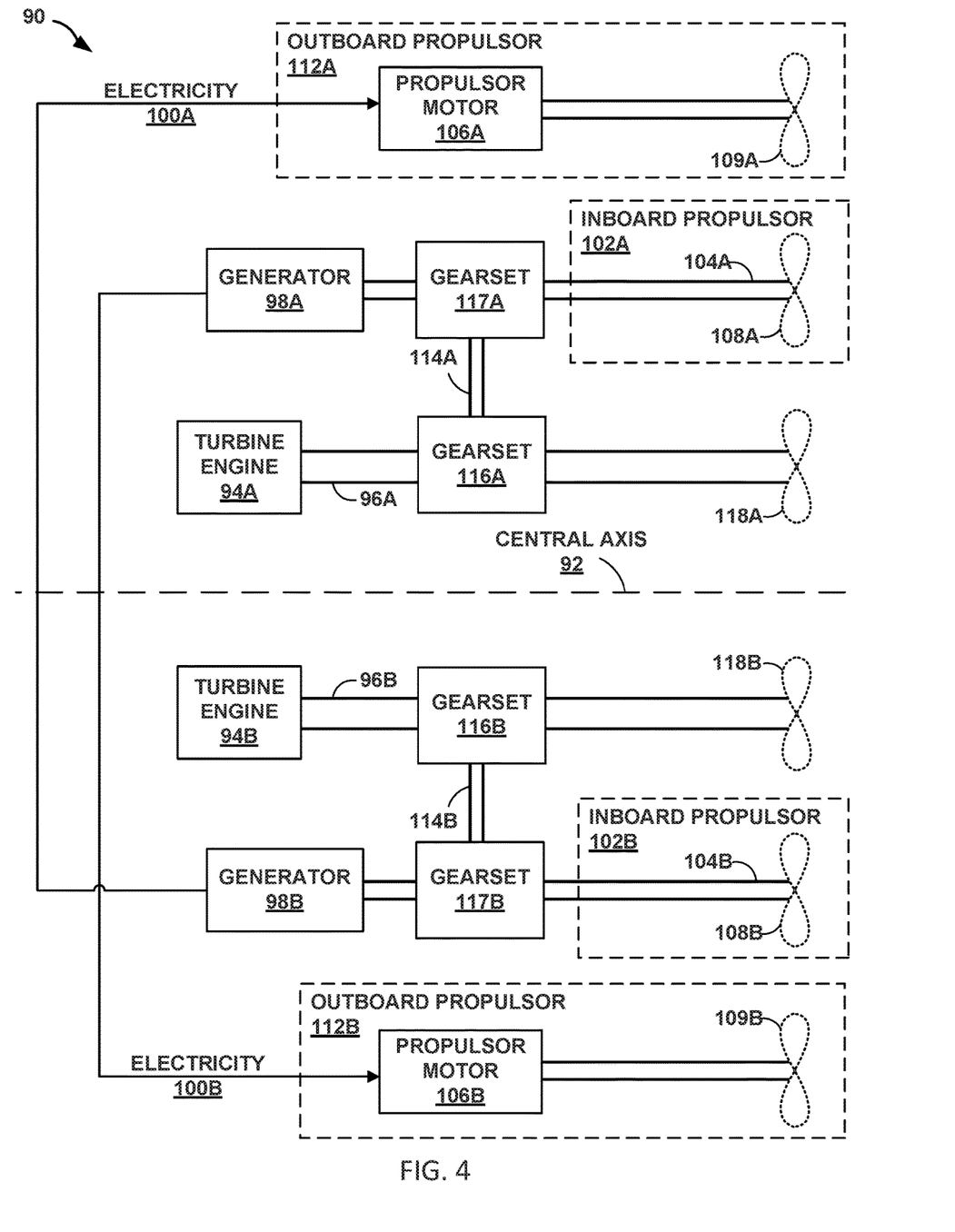
FIG. 4 is a conceptual block diagram illustrating a distributed propulsion system including two turbine engines, four propulsors, and two generators configured to produce electricity based on rotation of two propulsor shafts, in accordance with one or more techniques of this disclosure.

FIG. 4 is a conceptual block diagram illustrating a distributed propulsion system 90 including two turbine engines 94A and 94B, four propulsors 102A, 102B, 112A, and 112B, and two generators 98A and 98B configured to produce electricity 100A and 100B based on rotation of two propulsor shafts 104A and 104B, in accordance with one or more techniques of this disclosure. In some examples, system 90 may include additional or fewer turbine engines, additional or fewer generators, additional or fewer inboard propulsors, and/or additional or fewer outboard propulsors. The components of system 90 may function similar to the components of system 30 in FIG. 2, except that generators 98A and 98B are coupled to propulsor shafts 104A and 104B instead of engine shafts 96A and 96B. In addition, gearsets 116A, 116B, 117A, and 117B and linking shafts 114A and 114B may function similar to gearsets 86A and 86B and linking shaft 84 of system 60 in FIG. 3.

In some examples, a distributed propulsion system may include one or more energy storage units configured to store electrical energy. Each energy storage unit may be connected to an electrical bus that is supplied with electricity produced by one or more generators. Each energy storage unit may release electrical energy to supplement or replace power produced by a turbine engine.

Figure 5:
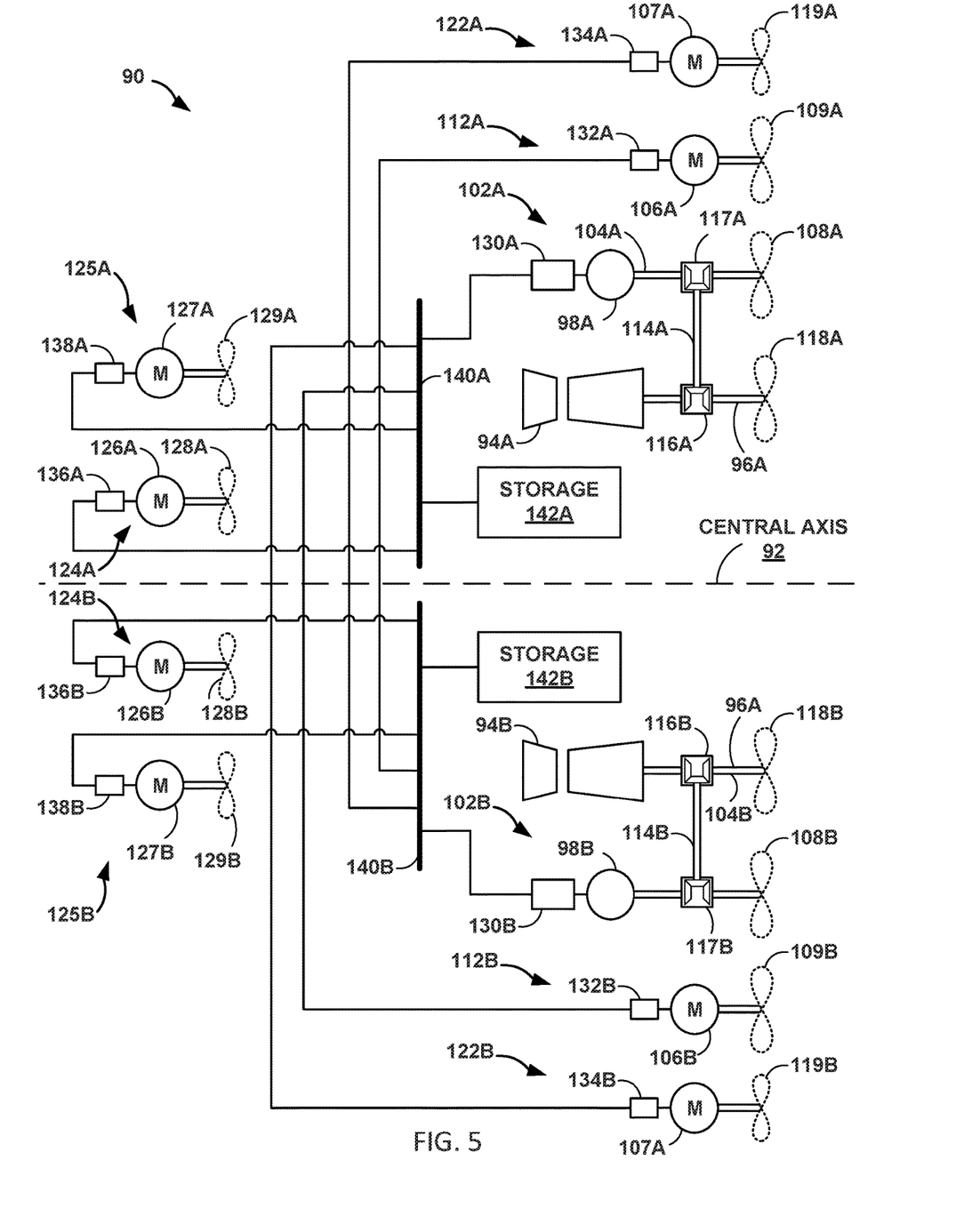
FIG. 5 is a conceptual block diagram illustrating a distributed propulsion system including two turbine engines and two energy storage units, in accordance with one or more techniques of this disclosure.

FIG. 5 is a conceptual block diagram illustrating distributed propulsion system 90 including two turbine engines 94A and 94B and two energy storage units 142A and 142B, in accordance with one or more techniques of this disclosure. In some examples, system 90 may include additional or fewer turbine engines, additional or fewer generators, additional or fewer inboard propulsors, and/or additional or fewer outboard propulsors. Along with the components depicted in FIG. 4, system 90 may include electrically driven propulsors 122A, 122B, 124A, 124B, 125A, and 125B, power conversion circuitry 130A, 130B, 132A, 132B, 134A, 134B, 136A, 136B, 138A, and 138B, electrical busses 140A and 140B, and energy storage units 142A and 142B.

In some examples, some of the propulsors of system 90 may have different configurations and thrust ratings. For example, propulsors 124A, 124B, 125A, and 125B may be back fans in the aft end of a vehicle. Propulsors 124A, 124B, 125A, and 125B may be boundary layer ingestion (BLI) fans that augment the aerodynamics of the vehicle. In some examples, propulsors 122A and 122B may be wingtip fans, and propulsors 112A and 112B may be wing-embedded fans. A controller of system 90 may control the operation of the propulsors to generate propulsion and to augment the aerodynamics of the vehicle.

Each of turbine engines 94A and 94B may be configured to drive propulsors on each side of central axis 92. For example, turbine engine 94A is configured to drive engine fan 118A, mechanically driven propulsor 102A, and generator 98A. Generator 98A may produce electricity, and power conversion circuitry 130A may convert the electricity to a second form of electricity. In some examples, generator 98A may produce alternating current (AC) electricity, such as one-phase AC electricity or three-phase AC electricity, and power conversion circuitry 130A may convert the AC electricity to DC electricity. Electrical bus 140A is configured to receive electricity from power conversion circuitry 130A. In some examples, electrical bus 140A may be a DC electrical bus.

Power conversion circuitry 132B, 134B, 136A, and 138A are configured to receive electricity from electrical bus 140A and convert the electricity to another form of electricity, such as one-phase AC electricity or three-phase AC electricity. Propulsor motors 106B, 107B, 126A, and 127A are configured to drive propulsor fans 109B, 119B, 128A, and 129A based on the other form of electricity delivered by power conversion circuitry 132B, 134B, 136A, and 138A. Thus, turbine engine 94A is configured to drive engine fan 118A, mechanically driven propulsor 102A, and electrically driven propulsors 112B, 122B, 124A, and 125A. In the example depicted in FIG. 5, only engine fan 118A is co-axial with engine shaft, and the remaining propulsors are not co-axial, i.e., remote.

Energy storage unit 142A is configured to receive and store electricity from electrical bus 140A. A controller of system 90 may be configured to control the storage and release of electricity from energy storage unit 142A. In some examples, the controller may cause energy storage unit 142A to release electricity to electrical bus 140A and cause generator 98A to receive the electricity from electrical bus 140A. Generator 98A may be configured to operate as an electric motor and reverse-drive propulsor shaft 104A and propulsor fan 108A.

The controller of system 90 may be configured to release electricity from energy storage units 142A and 142B to provide additional power to system 90. For example, during acceleration of a vehicle, the controller may cause energy storage units 142A and 142B to release electricity to increase the propulsion generated by system 90. The controller may also cause energy storage units 142A and 142B to release electricity to electrical loads in system 90 such as a fuel pump, a hydraulic pump, a cabin load, an interior lighting and display system, a heating and cooling system, and/or any other electrical load.

Energy storage units 142A and 142B may be sized to fit each particular application. For example, in a hot climate, smaller energy storage units may be desirable because it may be difficult to cool energy storage units 142A and 142B at high ambient temperatures. More energy storage may allow for a smaller turbine engine for an application by reducing the amount of power needed from the turbine engine at takeoff. A smaller turbine engine may operate at a higher efficiency during cruise, which increases fuel efficiency. In some examples, more energy storage may reduce the emissions of system 90 during high-propulsion events. For an aircraft, energy storage may offset the propulsion that is generated from burning fuel, which may reduce nitrogen oxide emissions. In some examples, energy storage units 142A and 142B may be relatively heavy, as compared to fuel, making energy storage units 142A and 142B less desirable for long-range applications.

Figure 6:
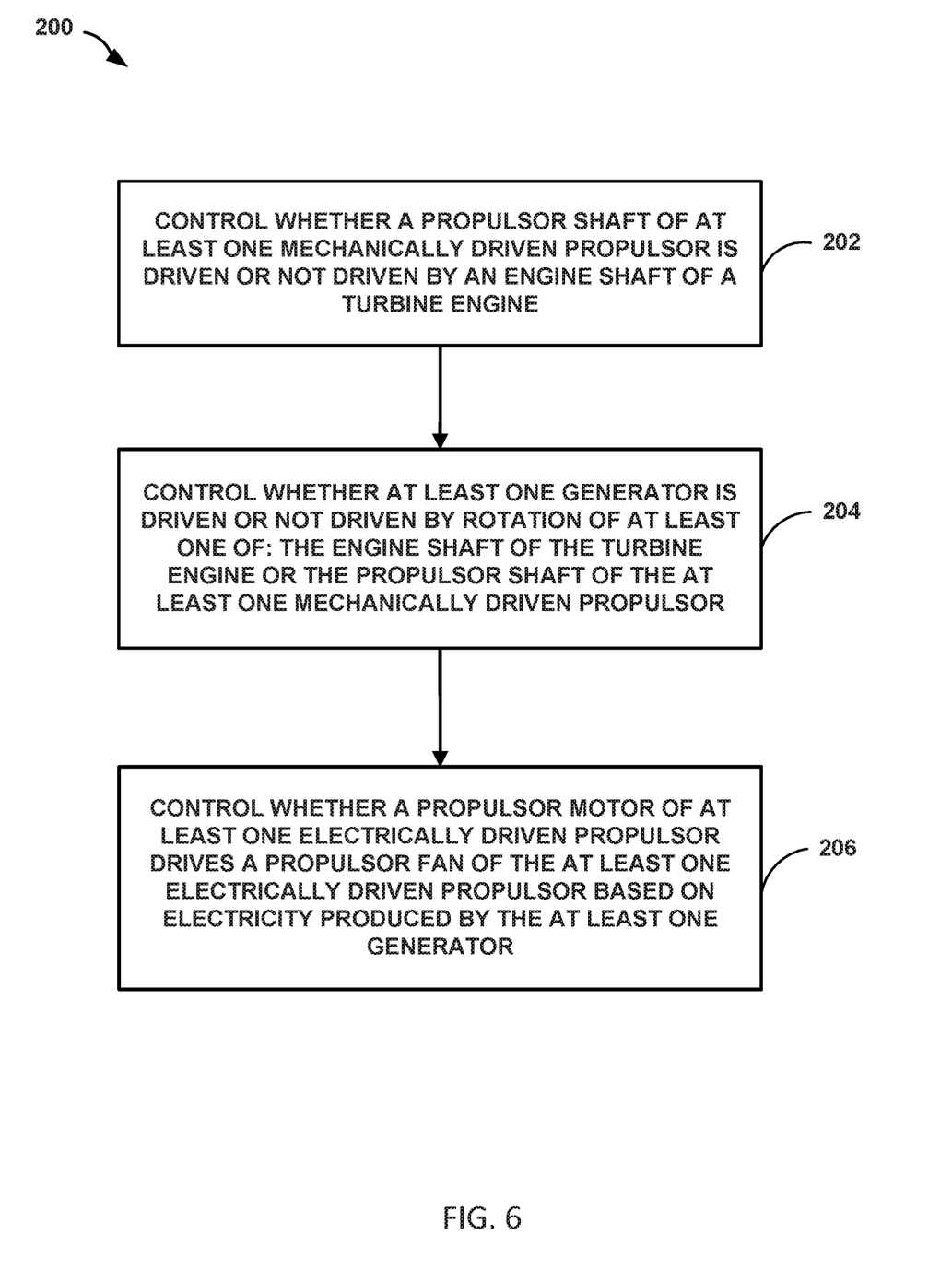
FIG. 6 is a flowchart illustrating an example process implemented by a controller of a distributed propulsion system including a turbine engine and two propulsors, in accordance with one or more techniques of this disclosure.

FIG. 6 is a flowchart illustrating an example process 200 implemented by a controller of a distributed propulsion system including a turbine engine and two propulsors, in accordance with one or more techniques of this disclosure. Operations 202-206 of process 200 are described in the context of distributed propulsion system 2 of FIG. 1, although other systems, such as systems 30, 60, 90, and 120 of FIGS. 2-5 may perform similar operations.

Process 200 includes controlling whether propulsor shaft 14 of at least one mechanically driven propulsor 12A is driven or not driven by engine shaft 6 of at least one turbine engine 4 (202). System 2 may include a mechanical distribution system (not shown in FIG. 1) that couples propulsor shaft 14 to engine shaft 6. Controller 20 may be configured to cause the mechanical distribution system to couple and/or decouple propulsor shaft 14 from engine shaft 6. The mechanical distribution system may couple and/or decouple by hydraulically locking and/or unlocking gears of the mechanical distribution system.

Process 200 also includes controlling whether at least one generator 8 is driven or not driven by rotation of at least one of: engine shaft 6 of the at least one turbine engine 4 or propulsor shaft 14 of the at least one mechanically driven propulsor 12A (204). Controller 20 may be configured to control whether generator 8 is driven by controlling an excitation current through the field coils in a rotor of generator 8. When controller 20 causes power supply circuitry to deliver an excitation current to the field coils of the rotor, the field coils may operate as electromagnets, causing the field windings in an armature of generator 8 to conduct electricity.

Process 200 also includes controlling whether propulsor motor 16 of at least one electrically driven propulsor 12B drives propulsor fan 18 of the at least one electrically driven propulsor 12B based on electricity 10 produced by the at least one generator 8 (206). Propulsor motor 16 may be connected to generator 8 by one or more wires and optional power conversion circuitry. Controller 20 may be configured to operate a reconfiguration element (not shown in FIG. 1) to switch on or off the electrical connection between generator 8 and propulsor motor 16. Controller 20 may also control the thrust produced by electrically driven propulsor 12B by controlling the amount of electrical power delivered by an electrical distribution system (not shown in FIG. 1) to generator 8.

FIG. 6 has described the operation of controller 20 and distributed propulsion system 2 in general. In some examples, system 2 may include more than one mechanically driven propulsor and/or more than one electrically driven propulsor. System 2 may also include more than one turbine engine and/or more than one generator. In some examples, controller 20 may control the distribution of energy in system 2 and the propulsion generated by the propulsors.

The following numbered examples demonstrate one or more aspects of the disclosure.

Example 1

A distributed propulsion system includes at least one turbine engine including an engine shaft and at least one mechanically driven propulsor, wherein a propulsor shaft of the at least one mechanically driven propulsor is not co-axial with the engine shaft of the at least one turbine engine and is driven by the engine shaft of the at least one turbine engine. The distributed propulsion system further includes at least one generator driven by rotation of at least one of the engine shaft of the at least one turbine engine or the propulsor shaft of the at least one mechanically driven propulsor. The distributed propulsion system also includes at least one electrically driven propulsor, wherein a propulsor motor of the at least one electrically driven propulsor drives a propulsor fan of the at least one electrically driven propulsor based on electricity produced by the at least one generator.

Example 2

The distributed propulsion system of example 1, wherein the at least one turbine engine is a first turbine engine, the at least one generator is a first generator, the at least one mechanically driven propulsor is a first mechanically driven propulsor, and the at least one electrically driven propulsor is a first electrically driven propulsor. The distributed propulsion system further includes a second turbine engine including an engine shaft, a second mechanically driven propulsor, wherein a propulsor shaft of the second mechanically driven propulsor is not co-axial with the engine shaft of the second turbine engine, and driven by the engine shaft of the second turbine engine. The distributed propulsion system further includes a second generator driven by rotation of at least one of the engine shaft of the second turbine engine or the propulsor shaft of the second mechanically driven propulsor. The distributed propulsion system further includes a second electrically driven propulsor, wherein a propulsor motor of the second electrically driven propulsor drives a propulsor fan of the second electrically driven propulsor based on electricity produced by the second generator.

Example 3

The distributed propulsion system of examples 1 or 2 or any combination thereof, wherein the distributed propulsion system is part of a vehicle, wherein the first mechanically driven propulsor and the second electrically driven propulsor are positioned on a first side of a central axis of the vehicle, wherein the second mechanically driven propulsor and the first electrically driven propulsor are positioned on a second side of the central axis of the vehicle.

Example 4

The distributed propulsion system of examples 1-3 or any combination thereof, further including a controller configured to control yaw of the vehicle if the first turbine engine or the second turbine engine fails by controlling a remaining turbine engine to drive at least one propulsor on the first side of the central axis of the vehicle and drive at least one propulsor on the second side of the central axis of the vehicle.

Example 5

The distributed propulsion system of examples 1-4 or any combination thereof, further including a controller configured to control whether the propulsor shaft of the at least one mechanically driven propulsor is driven or not driven by the engine shaft of the at least one turbine engine. The controller is further configured to control whether the at least one generator is driven or not driven by rotation of at least one of: the engine shaft of the at least one turbine engine or the propulsor shaft of the at least one mechanically driven propulsor. The controller is configured to control whether the propulsor motor of the at least one electrically driven propulsor drives the propulsor fan of the at least one electrically driven propulsor based on electricity produced by the at least one generator.

Example 6

The distributed propulsion system of examples 1-5 or any combination thereof, further including first power conversion circuitry configured to convert electricity produced by the at least one generator to a direct-current (DC) electricity, a DC bus configured to receive the DC electricity, and an energy storage unit configured to receive and store DC electricity from the DC bus. The distributed propulsion system further includes second power conversion circuitry configured to convert the DC electricity from the DC bus to an alternating-current (AC) electricity, wherein the propulsor motor of the at least one electrically driven propulsor is configured to drive the propulsor fan of the at least one electrically driven propulsor based on the AC electricity.

Example 7

The distributed propulsion system of examples 1-6 or any combination thereof, further including a controller configured to cause the energy storage unit to release stored DC electricity to the DC bus and cause the at least one generator to rotate at least one of the engine shaft or the propulsor shaft based on DC electricity received from the DC bus.

Example 8

The distributed propulsion system of examples 1-7 or any combination thereof, further including a first gearset, a linking shaft mechanically coupled to the engine shaft of the at least one turbine engine by at least the first gearset, and a second gearset, wherein the propulsor shaft of the at least one mechanically driven propulsor is mechanically coupled to the linking shaft by at least the second gearset.

Example 9

The distributed propulsion system of examples 1-8 or any combination thereof, wherein the at least one mechanically driven propulsor shaft is a first mechanically driven propulsor, the distributed propulsion system further including a second mechanically driven propulsor. A propulsor shaft of the second mechanically driven propulsor is not co-axial with the engine shaft of the at least one turbine engine and driven by the engine shaft of the at least one turbine engine.

Example 10

The distributed propulsion system of examples 1-9 or any combination thereof, wherein the at least one electrically driven propulsor is a first electrically driven propulsor, the distributed propulsion system further including a second electrically driven propulsor, wherein a propulsor motor of the second electrically driven propulsor drives a propulsor fan of the second electrically driven propulsor based on the electricity produced by the at least one generator.

Example 11

The distributed propulsion system of examples 1-10 or any combination thereof, further including at least one engine fan, wherein a shaft of the at least one engine fan is co-axial with an engine shaft of the at least one turbine engine and driven by the engine shaft of the at least one turbine engine.

Example 12

A method including controlling whether a propulsor shaft of at least one mechanically driven propulsor is driven or not driven by an engine shaft of at least one turbine engine, wherein the propulsor shaft of the at least one mechanically driven propulsor is not co-axial with the engine shaft of the at least one turbine engine and driven by the engine shaft of the at least one turbine engine. The method further includes controlling whether at least one generator is driven or not driven by rotation of at least one of: the engine shaft of the at least one turbine engine or the propulsor shaft of the at least one mechanically driven propulsor. The method further includes controlling whether a propulsor motor of at least one electrically driven propulsor drives a propulsor fan of the at least one electrically driven propulsor based on electricity produced by the at least one generator.

Example 13

The method of example 12, wherein the at least one turbine engine is a first turbine engine, wherein the at least one generator is a first generator, wherein the at least one mechanically driven propulsor is a first mechanically driven propulsor, wherein the at least one electrically driven propulsor is a first electrically driven propulsor. The method further includes controlling whether a propulsor shaft of a second mechanically driven propulsor is driven or not driven by an engine shaft of a second turbine engine, wherein the propulsor shaft of the second mechanically driven propulsor is not co-axial with the engine shaft of the second turbine engine and driven by the engine shaft of the second turbine engine. The method further includes controlling whether a second generator is driven or not driven by rotation of at least one of: the engine shaft of the second turbine engine or the propulsor shaft of the mechanically driven propulsor. The method further includes controlling whether a propulsor motor of a second electrically driven propulsor drives a propulsor fan of the second electrically driven propulsor based on electricity produced by the second generator.

Example 14

The method of examples 12 or 13 or any combination thereof, wherein the at least one mechanically driven propulsor shaft is a first mechanically driven propulsor, the method further including controlling whether a propulsor shaft of a second mechanically driven propulsor is driven or not driven by the engine shaft of the at least one turbine engine. The propulsor shaft of the second mechanically driven propulsor is not co-axial with the engine shaft of the at least one turbine engine and driven by the engine shaft of the at least one turbine engine.

Example 15

The method of examples 12-14 or any combination thereof, wherein the at least one electrically driven propulsor is a first electrically driven propulsor, the method further including controlling whether a propulsor motor of a second electrically driven propulsor drives a propulsor fan of the second electrically driven propulsor based on electricity produced by the at least one generator.

Example 16

The method of examples 12-15 or any combination thereof, further including causing first power conversion circuitry to convert electricity produced by the at least one generator to a direct-current (DC) electricity, distributing, via a DC bus, the DC electricity from the power conversion unit, and causing an energy storage unit to receive and store DC electricity from the DC bus. The method further includes causing second power conversion circuitry to convert the DC electricity from the DC bus to an alternating-current (AC) electricity, wherein controlling whether the propulsor motor of the at least one electrically driven propulsor drives the propulsor fan of the at least one electrically driven propulsor comprises controlling whether the propulsor motor of the at least one electrically driven propulsor drives the propulsor fan of the at least one electrically driven propulsor based on the AC electricity.

Example 17

The method of examples 12-16 or any combination thereof, further including causing the energy storage unit to release stored DC electricity to the DC bus and causing the at least one generator to rotate at least one of the engine shaft of the turbine engine or the propulsor shaft of the at least one mechanically driven propulsor based on DC electricity received from the DC bus.

Example 18

A vehicle including at least one first turbine engine including an engine shaft and at least one first inboard propulsor, wherein a propulsor shaft of the at least one first inboard propulsor is not co-axial with the engine shaft of the at least one first turbine engine and driven by the engine shaft of the at least one first turbine engine. The vehicle further includes at least one first generator driven by rotation of at least one of the engine shaft of the at least one first turbine engine or the propulsor shaft of the at least one first inboard propulsor, at least one second turbine engine including an engine shaft, and at least one second inboard propulsor, wherein a propulsor shaft of the at least one first inboard propulsor is not co-axial with the engine shaft of the at least one second turbine engine and driven by the engine shaft of the at least one second turbine engine. The vehicle further includes at least one second generator driven by rotation of at least one of: the engine shaft of the at least one second turbine engine or the propulsor shaft of the at least one second inboard propulsor, at least one first outboard propulsor, wherein a propulsor motor of the at least one first outboard propulsor drives a propulsor fan of the at least one first outboard propulsor based on electricity produced by the at least one first generator, and at least one second outboard propulsor, wherein a propulsor motor of the at least one second outboard propulsor drives a propulsor fan of the at least one second outboard propulsor based on electricity produced by the at least one first generator. The at least one first inboard propulsor and the at least one second outboard propulsor are positioned on a first side of a central axis of the vehicle, and the at least one second inboard propulsor and the at least one first outboard propulsor are positioned on a second side of the central axis.

Example 19

The vehicle of example 18, wherein the at least one first inboard propulsor is closer to the at least one first turbine engine than the at least one first outboard propulsor or the at least one second outboard propulsor, and wherein the at least one second inboard propulsor is closer to the at least one second turbine engine than the at least one first outboard propulsor or the at least one second outboard propulsor, the vehicle further including a controller configured to control yaw of the vehicle if the at least one first turbine engine or the at least one second turbine engine fails by controlling a remaining turbine engine to drive at least one propulsor on the first side of the central axis of the vehicle and drive at least one propulsor on the second side of the central axis of the vehicle.

Example 20

The vehicle of example 19, further including a controller configured to control whether the propulsor shaft of the at least one first inboard propulsor is driven or not driven by the engine shaft of the at least one first turbine engine. The controller is further configured to control whether the propulsor shaft of the at least one second inboard propulsor is driven or not driven by the engine shaft of the at least one second turbine engine. The controller is also configured to control whether the at least one first generator is driven or not driven by rotation of at least one of: the engine shaft of the at least one first turbine engine or the propulsor shaft of the at least one first inboard propulsor. The controller is configured to control whether the at least one second generator is driven or not driven by rotation of at least one of the engine shaft of the at least one first turbine engine or the propulsor shaft of the at least one second inboard propulsor. In addition, the controller is further configured to control whether the propulsor motor of the at least one first outboard propulsor drives the propulsor fan of the at least one first outboard propulsor based on the electricity produced by the at least one first generator. The controller is also configured to control whether the propulsor motor of the at least one second outboard propulsor drives the propulsor fan of the at least one second outboard propulsor based on the electricity produced by the at least one second generator.

Various examples have been described. These and other examples are within the scope of the following claims.

What is claimed is:

1. A distributed propulsion system that is part of a vehicle, the distributed propulsion system comprising:
   a first turbine engine including a first engine shaft;
   a second turbine engine including a second engine shaft;
   a first mechanically driven propulsor, wherein a first propulsor shaft of the first mechanically driven propulsor is:
      not co-axial with the first engine shaft, and
      driven by the first engine shaft;
   a second mechanically driven propulsor, wherein a second propulsor shaft of the second mechanically driven propulsor is:
      not co-axial with the second engine shaft, and
      driven by the second engine shaft;
   a first generator driven by rotation of at least one of: the first engine shaft or the first propulsor shaft;
   a second generator driven by rotation of at least one of: the second engine shaft or the second propulsor shaft;
   first power conversion circuitry configured to convert electricity produced by the first generator to a first direct-current (DC) electricity;
   a first DC bus configured to receive the first DC electricity;
   second power conversion circuitry configured to convert the first DC electricity from the first DC bus to a first alternating-current (AC) electricity;
   third power conversion circuitry configured to convert electricity produced by the second generator to a second DC electricity;
   a second DC bus configured to receive the second DC electricity;
   a first electrically driven propulsor, wherein a propulsor motor of the first electrically driven propulsor drives a propulsor fan of the first electrically driven propulsor based on the first AC electricity; and
   a second electrically driven propulsor, wherein a propulsor motor of the second electrically driven propulsor drives a propulsor fan of the second electrically driven propulsor based on electricity produced by the second generator concurrently with the propulsor motor of the first electrically driven propulsor driving the propulsor fan of the first electrically driven propulsor based on the first AC electricity,
   wherein the first generator, the first mechanically driven propulsor, and the second electrically driven propulsor are positioned on a first side of a central axis of the vehicle, and
   wherein the second generator, the second mechanically driven propulsor, and the first electrically driven propulsor are positioned on a second side of the central axis of the vehicle.

2. The distributed propulsion system of claim 1, further comprising a controller configured to control yaw of the vehicle if the first turbine engine or the second turbine engine fails by controlling a remaining turbine engine to drive at least one propulsor on the first side of the central axis of the vehicle and drive at least one propulsor on the second side of the central axis of the vehicle.

3. The distributed propulsion system of claim 1, further comprising a controller configured to:
   control whether the propulsor shaft of the first mechanically driven propulsor is driven or not driven by the first engine shaft;
   control whether the first generator is driven or not driven by rotation of at least one of: the first engine shaft or the propulsor shaft of the first mechanically driven propulsor; and
   control whether the propulsor motor of the first electrically driven propulsor drives the propulsor fan of the first electrically driven propulsor based on the first AC electricity.

4. The distributed propulsion system of claim 1, further comprising an energy storage unit configured to receive and store the first DC electricity from the first DC bus.

5. The distributed propulsion system of claim 4, further comprising a controller configured to:
   cause the energy storage unit to release stored DC electricity to the first DC bus; and
   cause the first generator to rotate at least one of the first engine shaft or the first propulsor shaft based on the first DC electricity received from the first DC bus.

6. The distributed propulsion system of claim 4,
   wherein the energy storage unit is a first energy storage unit configured to receive and store the first DC electricity from the first DC bus,
   the distributed propulsion system further comprising:
      a second energy storage unit configured to receive and store the second DC electricity from the second DC bus; and
      fourth power conversion circuitry configured to convert the second DC electricity from the DC bus to a second AC electricity, wherein the propulsor motor of the second electrically driven propulsor is configured to drive the propulsor fan of the second electrically driven propulsor based on the second AC electricity.

7. The distributed propulsion system of claim 1, further comprising:
   a first gearset;

a linking shaft mechanically coupled to the first engine shaft by at least the first gearset; and
a second gearset, wherein the propulsor shaft of the first mechanically driven propulsor is mechanically coupled to the linking shaft by at least the second gearset.

8. The distributed propulsion system of claim 1, further comprising a third mechanically driven propulsor, wherein a propulsor shaft of the third mechanically driven propulsor is:
not co-axial with the first engine shaft; and
driven by the first engine shaft.

9. The distributed propulsion system of claim 1, further comprising a third electrically driven propulsor, wherein a propulsor motor of the third electrically driven propulsor drives a propulsor fan of the third electrically driven propulsor based on the first DC electricity.

10. The distributed propulsion system of claim 1, further comprising at least one engine fan, wherein a shaft of the at least one engine fan is:
co-axial with the first engine shaft; and
driven by the first engine shaft.

11. The distributed propulsion system of claim 1, wherein the second DC bus is electrically isolated from the first DC bus.

12. A method comprising:
controlling whether a first propulsor shaft of a first mechanically driven propulsor is driven or not driven by a first engine shaft of a first turbine engine, wherein the first propulsor shaft of the first mechanically driven propulsor is:
not co-axial with the first engine shaft, and
driven by the first engine shaft;
controlling whether a second propulsor shaft of a second mechanically driven propulsor is driven or not driven by a second engine shaft of a second turbine engine, wherein the second propulsor shaft of the second mechanically driven propulsor is:
not co-axial with the second engine shaft, and
driven by the second engine shaft;
controlling whether a first generator is driven or not driven by rotation of at least one of: the first engine shaft or the first propulsor shaft of the first mechanically driven propulsor;
controlling whether a second generator is driven or not driven by rotation of at least one of: the second engine shaft or the second propulsor shaft of the second mechanically driven propulsor;
causing first power conversion circuitry to convert electricity produced by the first generator to a first direct-current (DC) electricity;
distributing, via a first DC bus, the first DC electricity from the first power conversion circuitry;
causing second power conversion circuitry to convert the first DC electricity from the first DC bus to a first alternating-current (AC) electricity;
causing third power conversion circuitry to convert electricity produced by the second generator to a second DC electricity;
distributing, via a second DC bus, the second DC electricity from the second power conversion circuitry;
controlling whether a propulsor motor of a first electrically driven propulsor drives a propulsor fan of the first electrically driven propulsor based on the first AC electricity; and
controlling whether a propulsor motor of a second electrically driven propulsor drives a propulsor fan of the second electrically driven propulsor based on electricity produced by the second generator concurrently with the propulsor motor of the first electrically driven propulsor driving the propulsor fan of the first electrically driven propulsor based on the first AC electricity,
wherein the first mechanically driven propulsor and the second electrically driven propulsor are positioned on a first side of a central axis of a vehicle, and
wherein the second mechanically driven propulsor and the first electrically driven propulsor are positioned on a second side of the central axis of the vehicle.

13. The method of claim 12, further comprising controlling whether a propulsor motor of a third electrically driven propulsor drives a propulsor fan of the third electrically driven propulsor based on the first DC electricity.

14. The method of claim 12, further comprising causing an energy storage unit to receive and store the first DC electricity from the first DC bus.

15. The method of claim 14, further comprising:
causing the energy storage unit to release stored DC electricity to the first DC bus; and
causing the first generator to rotate at least one of the first engine shaft or the propulsor shaft of the first mechanically driven propulsor based on the first DC electricity received from the first DC bus.

16. The method of claim 14,
wherein causing the energy storage unit to receive and store the first DC electricity comprises causing a first energy storage unit to receive and store the first DC electricity from the first DC bus, and
wherein the second DC bus is electrically isolated from the first DC bus,
the method further comprising:
causing a second energy storage unit to receive and store the second DC electricity from the second DC bus; and
causing fourth power conversion circuitry to convert the second DC electricity from the second DC bus to a second AC electricity,
wherein controlling whether the propulsor motor of the second electrically driven propulsor drives the propulsor fan of the second electrically driven propulsor comprises controlling whether the propulsor motor of the second electrically driven propulsor drives the propulsor fan of the second electrically driven propulsor based on the second AC electricity.

17. A vehicle comprising:
at least one first turbine engine including an engine shaft;
at least one first inboard propulsor, wherein a propulsor shaft of the at least one first inboard propulsor is:
not co-axial with the engine shaft of the at least one first turbine engine, and
driven by the engine shaft of the at least one first turbine engine;
at least one first generator driven by rotation of at least one of: the engine shaft of the at least one first turbine engine or the propulsor shaft of the at least one first inboard propulsor;
at least one second turbine engine including an engine shaft;
at least one second inboard propulsor, wherein a propulsor shaft of the at least one first inboard propulsor is:
not co-axial with the engine shaft of the at least one second turbine engine, and
driven by the engine shaft of the at least one second turbine engine;

at least one second generator driven by rotation of at least one of: the engine shaft of the at least one second turbine engine or the propulsor shaft of the at least one second inboard propulsor;

first power conversion circuitry configured to convert electricity produced by the at least one first generator to a first direct-current (DC) electricity;

a first DC bus configured to receive the first DC electricity;

second power conversion circuitry configured to convert the first DC electricity from the first DC bus to a first alternating-current (AC) electricity;

third power conversion circuitry configured to convert electricity produced by the second generator to a second DC electricity;

a second DC bus configured to receive the second DC electricity;

at least one first outboard propulsor, wherein a propulsor motor of the at least one first outboard propulsor drives a propulsor fan of the at least one first outboard propulsor based on the first AC electricity; and at least one second outboard propulsor, wherein a propulsor motor of the at least one second outboard propulsor drives a propulsor fan of the at least one second outboard propulsor based on electricity produced by the at least one second generator concurrently with the propulsor motor of the first electrically driven propulsor driving the propulsor fan of the first electrically driven propulsor based on the first AC electricity, wherein the at least one first inboard propulsor and the at least one second outboard propulsor are positioned on a first side of a central axis of the vehicle, wherein the at least one second inboard propulsor and the at least one first outboard propulsor are positioned on a second side of the central axis.

18. The vehicle of claim 17, wherein the at least one first inboard propulsor is closer to the at least one first turbine engine than the at least one first outboard propulsor or the at least one second outboard propulsor, and wherein the at least one second inboard propulsor is closer to the at least one second turbine engine than the at least one first outboard propulsor or the at least one second outboard propulsor, the vehicle further comprising a controller configured to control yaw of the vehicle if the at least one first turbine engine or the at least one second turbine engine fails by controlling a remaining turbine engine to drive at least one propulsor on the first side of the central axis of the vehicle and drive at least one propulsor on the second side of the central axis of the vehicle.

19. The vehicle of claim 17, further comprising a controller configured to:

control whether the propulsor shaft of the at least one first inboard propulsor is driven or not driven by the engine shaft of the at least one first turbine engine;

control whether the propulsor shaft of the at least one second inboard propulsor is driven or not driven by the engine shaft of the at least one second turbine engine;

control whether the at least one first generator is driven or not driven by rotation of at least one of: the engine shaft of the at least one first turbine engine or the propulsor shaft of the at least one first inboard propulsor;

control whether the at least one second generator is driven or not driven by rotation of at least one of: the engine shaft of the at least one first turbine engine or the propulsor shaft of the at least one second inboard propulsor;

control whether the propulsor motor of the at least one first outboard propulsor drives the propulsor fan of the at least one first outboard propulsor based on the first AC electricity; and control whether the propulsor motor of the at least one second outboard propulsor drives the propulsor fan of the at least one second outboard propulsor based on the electricity produced by the at least one second generator.

20. The vehicle of claim 17, further comprising:

a first energy storage unit configured to receive and store the first DC electricity from the first DC bus;

a second energy storage unit configured to receive and store the second DC electricity from the second DC bus; and fourth power conversion circuitry configured to convert the second DC electricity from the second DC bus to a second AC electricity, wherein the propulsor motor of the second electrically driven propulsor is configured to drive the propulsor fan of the second electrically driven propulsor based on the second AC electricity.

* * * * *